United States Patent
Hendrix

(10) Patent No.: US 8,219,478 B2
(45) Date of Patent: *Jul. 10, 2012

(54) SYSTEM AND METHOD USING ASSET SALE AND LOAN FOR RISK TRANSFERENCE

(75) Inventor: Derrell Hendrix, Esher (GB)

(73) Assignee: Karson Management, Ltd. (BM)

(*) Notice: Subject to any disclaimer, the term of this patent is extended or adjusted under 35 U.S.C. 154(b) by 346 days.

This patent is subject to a terminal disclaimer.

(21) Appl. No.: 12/437,886

(22) Filed: May 8, 2009

(65) Prior Publication Data
US 2009/0281962 A1    Nov. 12, 2009

Related U.S. Application Data

(60) Provisional application No. 61/052,035, filed on May 9, 2008, provisional application No. 61/052,048, filed on May 9, 2008, provisional application No. 61/052,067, filed on May 9, 2008, provisional application No. 61/052,053, filed on May 9, 2008.

(51) Int. Cl.
*G06Q 40/00* (2012.01)
(52) U.S. Cl. .................................................. 705/36 R
(58) Field of Classification Search ................ 705/36 R, 705/35
See application file for complete search history.

(56) References Cited

U.S. PATENT DOCUMENTS

| | | | |
|---|---|---|---|
| 5,761,441 A * | 6/1998 | Bennett | 705/35 |
| 5,983,206 A | 11/1999 | Oppenheimer | |
| 6,167,384 A | 12/2000 | Graff | |
| 6,321,212 B1 | 11/2001 | Lange | |
| 6,345,262 B1 | 2/2002 | Madden | |
| 6,360,210 B1 | 3/2002 | Wallman | |
| 7,315,842 B1 | 1/2008 | Wang | |
| 7,580,872 B2 | 8/2009 | Van Slyke et al. | |
| 7,778,904 B1 * | 8/2010 | Lyons | 705/35 |
| 7,778,905 B2 | 8/2010 | Arnott | |
| 7,899,724 B1 | 3/2011 | Savasoglu et al. | |
| 2002/0042770 A1 | 4/2002 | Slyke et al. | |
| 2002/0077952 A1 | 6/2002 | Eckert et al. | |

(Continued)

OTHER PUBLICATIONS

Jobst, Andreas A.: What is structured finance? Working Paper, Sep. 2005, pp. 1-7.*

(Continued)

*Primary Examiner* — Bijendra K Shrestha
(74) *Attorney, Agent, or Firm* — Mayer Brown LLP

(57) ABSTRACT

Disclosed herein is a system and method for eliminating or transferring the non-economic risk of financial securities. The system and method serves to avoid non-economic losses in the first instance, and to counter the adverse capital impact of prior non-economic gap losses by providing capital relief consistent with a determined protected amount. A client makes a non-recourse loan to a provider. In return, the provider agrees to purchase a fixed income security (FIS) Portfolio from the client for an purchase price greater than the amount of the loan. If the aggregate principal payments (APP) of the FIS Portfolio exceed the purchase price, the parties engage in profit sharing of the APP over the purchase price. If the final market value of the FIS Portfolio is below the purchase price and above the loan amount, the losses are absorbed by the provider. In a broader implementation of the program, the client makes a revolving term loan to the provider, which over time the provider uses to acquire assets from the client to be used as collateral for the loan.

24 Claims, 11 Drawing Sheets

INDIVIDUAL ASSET SALE AND LOAN WITH INVESTOR BREAKDOWN AND INVESTMENT ADVISOR: PRINCIPAL TRANSACTIONS AT MATURITY

U.S. PATENT DOCUMENTS

| | | | |
|---|---|---|---|
| 2002/0095361 A1* | 7/2002 | Trenk et al. | 705/35 |
| 2002/0116303 A1 | 8/2002 | Hayashi | |
| 2002/0147671 A1 | 10/2002 | Sloan et al. | |
| 2003/0018571 A1 | 1/2003 | Eckert et al. | |
| 2003/0028468 A1 | 2/2003 | Wong et al. | |
| 2004/0220872 A1* | 11/2004 | Pollock, III | 705/38 |
| 2004/0230468 A1 | 11/2004 | King et al. | |
| 2004/0260578 A1 | 12/2004 | Jin | |
| 2005/0080700 A1* | 4/2005 | Bancroft | 705/35 |
| 2005/0119962 A1* | 6/2005 | Bowen et al. | 705/37 |
| 2005/0137957 A1 | 6/2005 | McDaniel | |
| 2006/0047600 A1* | 3/2006 | Bodenheim et al. | 705/40 |
| 2006/0080193 A1* | 4/2006 | McMurtray et al. | 705/35 |
| 2007/0100725 A1 | 5/2007 | Devito | |
| 2007/0124236 A1 | 5/2007 | Grichnik et al. | |
| 2007/0255647 A1 | 11/2007 | Eicher et al. | |
| 2008/0140553 A1 | 6/2008 | Kelly | |
| 2008/0235152 A1 | 9/2008 | O'Brien et al. | |
| 2009/0030852 A1 | 1/2009 | Braun et al. | |
| 2009/0043637 A1 | 2/2009 | Eder | |
| 2009/0248561 A1 | 10/2009 | McIntosh | |
| 2010/0088122 A1* | 4/2010 | Gray et al. | 705/4 |
| 2010/0153296 A1 | 6/2010 | Volpert | |
| 2010/0185562 A1 | 7/2010 | Nafeh | |
| 2011/0047098 A1 | 2/2011 | Erlanger | |
| 2011/0112986 A1 | 5/2011 | Flinn et al. | |

OTHER PUBLICATIONS

Giddy, Ian H.: Asset secutitization in Asia, NewYork University, 2000, pp. 1-30.*

Morozovsky et al.: A new loan—stock instrument, Jul. 2000, pp. 1-11.*

The Market Value of a Bond, Financial Education, Jul. 11, 2007.

Definition of Redemption at The Free Dictionary.

Office Action, U.S. Appl. No. 12/437,831 (Apr. 14, 2011).

Applicant Initiated Interview Request Form, U.S. Appl. No. 12/437,831 (Aug. 10, 2011).

Applicant-Initiated Interview Summary, U.S. Appl. No. 12/437,831 (Aug. 19, 2011).

Amendment and Response to the Office Action Mailed Apr. 14, 2011, U.S. Appl. No. 12/437,831 (Oct. 12, 2011).

Final Office Action, U.S. Appl. No. 12/437,831 (Dec. 13, 2011).

Examiner-Initiated Interview Summary, U.S. Appl. No. 12/437,868 (Sep. 20, 2011).

Office Action, U.S. Appl. No. 12/437,868 (Sep. 20, 2011).

Notice of Allowability, U.S. Appl. No. 12/437,852 (Oct. 4, 2011).

Notice of Allowance and Fee(s) Due (with Examiner-Initiated Interview Summary), U.S. Appl. No. 12/437,852 (Oct. 4, 2011).

* cited by examiner

SYSTEM AND METHOD USING ASSET SALE AND LOAN FOR RISK TRANSFERENCE

CROSS REFERENCE TO RELATED APPLICATIONS

This application claims the benefit of U.S. Provisional Application No. 61/052,035, filed May 9, 2008; U.S. Provisional Application No. 61/052,048, filed May 9, 2008; U.S. Provisional Application No. 61/052,067, filed May 9, 2008; and U.S. Provisional Application No. 61/052,053, filed May 9, 2008. This application is related to the following co-pending provisional applications: "SYSTEM AND METHOD USING SECURITIES ISSUANCE FOR RISK TRANSFERENCE," filed May 8, 2009; "SYSTEM AND METHOD USING CONTRACT FOR RISK TRANSFERENCE," filed May 8, 2009; and "SYSTEM AND METHOD USING INSURANCE FOR RISK TRANSFERENCE," filed May 8, 2009, all of which are hereby incorporated by reference in their entirety as if fully set forth herein.

FIELD OF THE INVENTION

The present invention relates generally to computer-implemented systems and methods for transferring/acquiring a defined risk/discount associated with a security or portfolio of securities. More specifically, the invention relates to computer-implemented systems and methods for transferring risk through an asset purchase contingent on a loan agreement.

BACKGROUND OF THE INVENTION

A significant number of banks, insurance companies, and other financial institutions maintain partial or full interests in structured finance and fixed income securities (FIS). These securities may include, for instance, those backed by mortgages, home equity loans, credit card receivables, auto loans, and collateralized loan obligations, as well as collateralized debt obligations (CDOs) and credit default swaps on fixed income securities and CDOs of fixed income securities (collectively, FIS Portfolios). To collect value from FIS a financial institution may treat FIS as an asset which it either intends to trade, or hold to maturity and collect principal and interest payments. Regardless of whether it seeks to keep, transfer, or acquire FIS, it is important that the financial institution be able to determine the value of FIS, if not for purposes of market pricing, then for the fact that the value of held FIS will affect a financial institution's balance sheet and possibly its income statement. In addition, the reported value of FIS may affect its credit rating or otherwise influence the amount of capital necessary to maintain a given FIS or FIS Portfolio. However, given characteristic market and regulatory conditions it is difficult to appropriately value, finance, or trade FIS, regardless of the credit quality of its underlying assets or cash flows.

Changes by accounting standards boards, such as the Financial Accounting Standards Board (FASB), that govern the accounting profession will affect the perceived value of FIS by modifying the accounting standards used to determine the fair value of FIS. For example, under prior International Financial Reporting Standards, and with changes to U.S. General Accepted Accounting Principles, the value of FIS has been increasingly tied to fair value as determined by the transferability of the FIS. Under these prior accounting standards the fair value was determined by the price that would be received to sell the asset or to transfer a liability in an orderly transaction between market participants at the measurement date; however, this accounting treatment contrasted with the previous practice of many financial institutions, which involved estimating fair value using financial models that determine an expected value of FIS or FIS Portfolios. As seen in, for example, FASB Staff Position 157-4, the more recent accounting standard position has been to permit some flexibility in determining fair value in distressed market conditions or in situations where there has been a significant decrease in the volume and level of activity for the asset or liability being valued. Despite these changes, the prevailing standards continue to focus on determining the value of the asset or liability under current market conditions. As a result, the current market value of the FIS, as defined for accounting purposes, may be significantly lower than the expected value of the collection of principal and interest on the underlying securities.

In another instance, changes in market supply and demand for certain classes of securities can also affect the perceived value of given FIS. For example, difficulties surrounding the decline of securities backed by sub-prime mortgages have affected the values of FIS under fair value accounting standards. Factors such as a perceived lack of transparency, as well as the presence of securities issued by highly leveraged entities investing in FIS Portfolios (such as structured investment vehicles and conduits), have led investors to largely exit certain sectors of the FIS market. Despite attempts to increase transparency in accounting standards, the main sources of investor concern relate to an impaired ability to establish a current estimated market value for FIS, estimate future market value or maturity value for FIS, and estimate correlations between various FIS investments. As a result, investors are willing to pay less to acquire the securities affected by these concerns.

In addition to other factors, the changes to accounting standards and variations in investor demand represent forces that give rise to non-economic changes in the value of FIS. Although not generally based on the value or quality of the underlying securities (i.e., the expected amount of repayment of principle at maturity or upon default, as determined by qualitative analysis or by use of a model), these non-economic changes in value have significant accounting consequences on the holders of FIS and participants in FIS markets. In the current environment, the above factors have resulted in an increasing number of market participants having determined that the current market or liquidation value for FIS is often significantly below the expected or model-based value, resulting in the booking of substantial losses or reductions in capital resources. This, in turn, has prompted many financial institutions and other holders of interest in FIS to either sell assets (to avoid future risk of loss) or raise capital (in order to preserve or restore regulatory or rating agency capital ratios). Many financial institutions with access to the equity market have elected to raise fully-dilutive equity capital in order to shore up capital adequacy measures, rather than sell and realize non-economic losses on FIS Portfolios.

As a result, it would be advantageous to have a method for an arm's-length solution for eliminating or reducing non-economic risk that supports a higher-than liquidation value for FIS and FIS Portfolios, and satisfies financial institution auditors, rating agencies, regulators and analysts in terms of capital relief In addition, it would be advantageous to have a method that enables a financial institution to move FIS Portfolios risk from a trading account that is subject to mark-to-market valuation to a held-to-maturity account, that likely is not.

SUMMARY OF THE INVENTION

Disclosed herein are methods and systems, including computer program products, for eliminating or transferring the non-economic risk of financial securities. The systems and methods serve to avoid non-economic losses in the first instance, and to counter the adverse capital impact of prior non-economic gap losses by providing capital relief. In addition, the systems and methods described herein have the effect of transferring risk and countering the adverse profit-and-loss and capital impact of a non-economic component of marking to market in relation to illiquid securities or credit derivatives portfolios. More specifically, the systems and methods described herein provide for transferring risk up to an amount equal to the difference between (a) the current liquidation or fair market value of an individual security or a portfolio of securities and, (b) an economic value that is equal to the present value of expected future principal payments discounted at an appropriate discount rate (e.g., the swap rate for the corresponding maturity) of the security or the portfolio of securities (the "Gap" risk).

According to an embodiment of the system and method, a conjunctive asset sale and loan program is implemented with regard to a single asset, such as an FIS or FIS Portfolio. At inception, two parties enter into an agreement whereby the first party makes a non-recourse loan to the investment firm, and wherein the amount of the loan is in some proportion to the book value of a selected asset originally owned by the first party. In return, the second party agrees to purchase the selected asset for an amount that is also in proportion to the book value of the selected asset, and which is generally more than the loan amount. Through this initial transaction, the first party may realize immediate capital relief equal to the purchase price of the asset, and may record a profit in the amount that the purchase price exceeds the fair market or book value of the asset. At the redemption or maturity date of the asset, the final total market value of the asset is determined. If the final market value of the asset exceeds the purchase price of the asset, then the parties may engage in profit sharing according to the terms of their agreement. If the final market value of the asset is below the purchase price and above the loan amount, the losses are absorbed by the second party. However, if the final market value of the asset is less than the loan amount, then the loan is not repaid in full and recovery is limited as determined by the non-recourse nature of the loan.

In another embodiment, an asset purchase contingent revolving term loan program is utilized, wherein two parties enter into an agreement such that the first party makes a revolving term loan to the second party. The second party uses the loan proceeds, together with equity provided by the second party, initially to provide financing to a securities market according to agreed criteria. Over time the second party uses the loan (i.e., the unused portion of the loan plus the proceeds from maturing securities market transactions), as well as its own dedicated capital, to acquire assets to be used as collateral for the loan. The rollover or extension of the loan may be contingent upon the second party acquiring assets prior to a given date, and may be terminated by the first party if these and other conditions are not met at the first scheduled maturity or rollover date. After acquiring assets, the loan will automatically extend to the full term of the asset acquired and be repaid on a senior and non-recourse basis from maturity payments of acquired assets, sales of acquired assets, default recovery proceeds of acquired assets, and future proceeds of maturing securities market transactions. If the aggregate sum of such payments is less than the loan, the first party will have a loan loss. If the sum of such payments exceeds the loan but is less than the purchase price of the acquired assets, the second party will bear the loss.

In another embodiment, a processing system is relied upon to execute one or more of the steps of the above programs. The processing system includes a processor, one or more input devices (such as a keyboard or mouse) for inputting data into the system, and one or more displays for outputting information to the user. The processing system also includes a memory for storing data and instructions executable by the processor, and for storing an operating system. The memory may also include instructions for modeling the Gap risk in various securities and security portfolios, determining the aggregate principal payments of a security portfolio, and determining loan variables and interest rates, in addition to various other steps as required by the programs herein.

These and other aspects and advantages will become apparent to those of ordinary skill in the art by reading the following detailed description, with reference where appropriate to the accompanying drawings. Further, it should be understood that the foregoing summary is merely illustrative and is not intended to limit in any manner the scope or range of equivalents to which the appended claims are lawfully entitled.

BRIEF DESCRIPTION OF THE DRAWINGS

The invention is described below in connection with the following illustrative figures, wherein.

DETAILED DESCRIPTION

Figure 1:
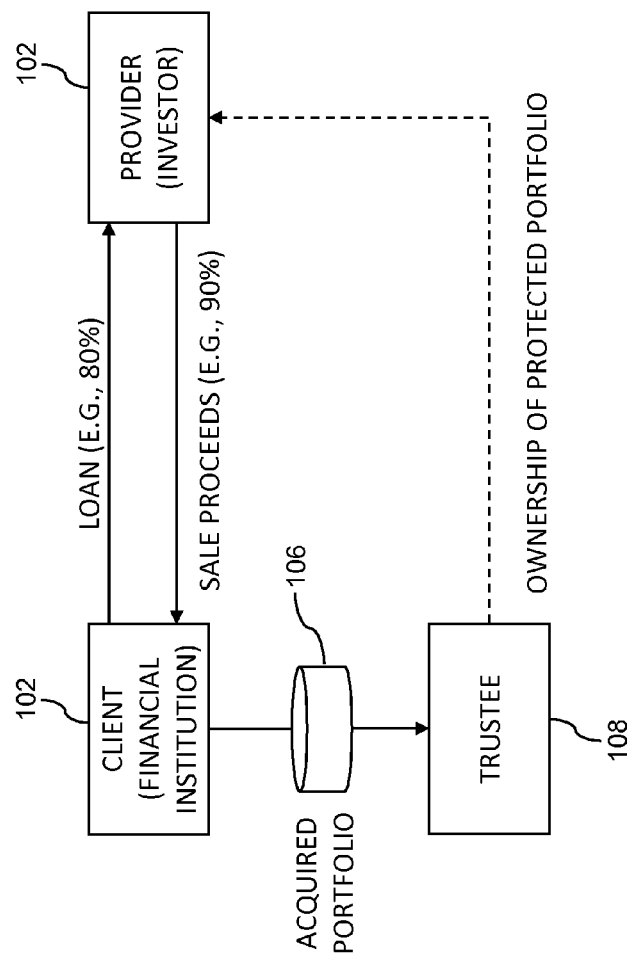
FIG. 1 is a block diagram of principal transactions at the inception of an individual asset sale and loan program, according to an embodiment.

While the present invention is capable of being embodied in various forms, for simplicity and illustrative purposes, the principles of the invention are described by referring to several embodiments thereof. It is understood, however, that the present disclosure is to be considered as an exemplification of the claimed subject matter, and is not intended to limit the appended claims to the specific embodiments illustrated. It will be apparent to one of ordinary skill in the art that the invention may be practiced without limitation to these specific details. In other instances, well-known methods and structures have not been described in detail so as not to unnecessarily obscure the invention.

In general, programs described below allow for a first entity, such as a financial institution, to avoid Gap losses in the first instance, and to mitigate the adverse capital impact of historical Gap losses. One of the tangible results of the program is the receipt of capital relief by restoring the valuation difference between the reported or fair market value of an asset at the inception of the program, and the agreed purchase price or protection value. In addition, the programs allow the first entity to take assets, such as FIS or FIS Portfolios, currently held in available for sale and trading accounts (and reported on a fair-value/marked-to-market basis), and through implementation of the program, to re-characterize the resultant exposure of these assets (e.g., the loan) as held-to-maturity (HTM). The program also permits the first entity to allocate and transfer all or a portion of the risk associated with gap losses to a second entity, such as an investment firm, that is party to the program.

As further described below, one program is implemented with regard to an FIS or FIS Portfolio as a single conjunctive asset sale and loan between the two entities. At inception, a first party, such as a financial institution, and an insolvency-remote second party, such as an investment firm, enter into an agreement whereby the financial institution makes a non-recourse loan to the investment firm, and wherein the amount of the loan is in proportion to the book value of a selected asset, such as a FIS or FIS Portfolio, owned by the first party. In return, the second party agrees to purchase the selected asset for an agreed-upon purchase amount that is also in proportion to the book value of the selected asset, and which is generally above the amount of the loan. The selected asset is thereby purchased using both proceeds from the loan and capital raised by the second party, such as through the sale of second party equity. Through this initial transaction, the first party realizes immediate capital relief equal to the asset purchase value, and would be expected to record a profit where the purchase value exceeds the fair market or book value of the selected asset.

Over the course of the conjunctive asset sale and loan program, the loan is repaid to the first party by the second party on a senior and non-recourse basis. By arrangement of the parties, the loan repayments are provided by the maturity or default recovery proceeds of the selected asset (the aggregate Principal payments, or APP). Where the APP is less than the loan amount, the loan is not repaid in full but is instead repaid through recovery proceeds, if any, in accordance with the non-recourse nature of the loan. However, where the APP exceeds the purchase value of the loan (i.e., an "excess" exists), the loan is repaid in full and the parties participate in profit sharing according to program arrangements. Where the APP is greater than the loan but less than the purchase value, there will be a loss that is borne entirely by the second party.

Thus, where the first party, prior to this program, held the selected asset in its for-sale or trading account marked at and subject to fluctuations in market value, it is subsequently allowed to book the loan in an HTM account. Through the program, however, the first party still holds an interest in the maturity value of the selected asset. In addition, the first party experiences relief from at least a portion of the Gap risk associated with losses in the value of the selected asset, in that any losses, in excess of those previously realized, are limited to the loan amount (i.e., if assets are sold at a purchase price of less than original cost paid by the first party, the first party will bear the initial loss which was realized prior to the program, the second party will bear the Gap loss that it assumed, and the first party will bear any remaining losses). By arrangement, and in return for the second party taking on the Gap risk, the first party may be limited by collecting only a portion of the excess APP over the purchase value of the selected asset, with the second party receiving the remaining portion.

As further described below, the parties may alternatively or additionally enter into a broader asset purchase contingent revolving term loan agreement. Such a broader agreement may facilitate the ability of the parties to engage in asset purchase and loan transactions at any time over the course of the agreement. Such individual asset purchase and loan transactions under the asset purchase contingent revolving term loan program may operate under arrangements similar to those made according to the asset sale and loan program described above.

At the inception of an asset purchase contingent revolving term loan program, the first party provides a revolving term loan to the second party. By agreement, this revolving term loan is subject to an overall maximum loan-to-value figure. Using both the loan proceeds and its own contributed capital, such as through the sale of second party equity notes, the second party initially acquires assets by entering into reverse repurchase agreements, or reverse repos, and then acquires one or more assets (such as FIS or FIS Portfolios) owned by the first party. The revolving portion of the loan may be contingent on the second party acquiring one or more of the first party's assets or acquiring a minimum portion of the first party's selected assets before a given date.

Per the asset purchase contingent revolving term loan agreement, the second party initially utilizes the revolving loan and its own capital to acquire repo securities by entering into reverse repos based on criteria agreed-upon by the parties. The repo market margin provided for in the reverse repos (i.e., the "haircut") generates additional collateral coverage for the revolving term loan, and thereby supports flexibility with regard to the loan spread. Over time, and as a condition to maintaining the loan, the second party acquires assets owned by the first party and assumes the Gap risk associated with the acquired assets. Once the loan is fully drawn, additional asset acquisitions will be financed by maturing reverse repos. Unlike the repo securities, which due to repo market haircuts are acquired for less than market value, the acquired assets are generally purchased at values greater than their reported book value, thereby reducing the overall collateral coverage for the loan. Accordingly, the loan spread may be increased in accordance with the acquisition of assets, or by a previously agreed-upon margin.

Through selling the assets and entering into a non-recourse loan secured by the assets, the first party is able to record a profit on the sale of the assets and carry the new loan in an HTM account. The first party may also experience a gain on sale and risk-based or accounting capital relief/restoration in the amount of capital contributed by the second party to acquire the asset (i.e., the capital used to purchase the asset that is not drawn from first party-provided loan proceeds). As with the individual asset sale and loan program, in return for the second party taking on a portion of the Gap risk, the first party may be limited in its ability to retain any excess APP over the purchase value of any selected assets.

As is apparent to one of skill in the art, variations of the conjunctive asset sale and loan program (or portions thereof) may be instantiated under a broad asset purchase contingent revolving term loan agreement between the parties. Additional details regarding these and other programs and agreements is set forth in greater detail in the sections below.

Individual Asset Sale and Loan Program

Under the individual asset sale and loan program, two parties enter into an agreement whereby the first party makes a loan to the second party, and in return the second party agrees to purchase an asset of the first party for an agreed upon value. At the redemption or maturity date of the asset, the principal amount repaid on the asset is determined by an independent party (e.g., a trustee). If the final repayment amount of the asset exceeds the purchase price of the asset, then the parties may engage in profit sharing according to the terms of their agreement. If the final market value of the asset is below the purchase price and above the loan amount, the losses are absorbed by the second party. However, if the final market value of the asset is less than the loan amount, then the loan is not repaid in full and recovery is limited as determined by the non-recourse nature of the loan.

The above agreement may be entered into by a financial institution (the "Client") that desires to transfer a specific FIS or FIS Portfolio (the "Acquired Portfolio") to an investment firm (the "Provider"). The Acquired Portfolio has a fair market or book value (the "Book Value"), as determined by generally accepted accounting principles or international financial reporting standards. The Book Value of the portfolio is consistent with the listed value of the portfolio on the Client's accounting statements. The Acquired Portfolio also has an expected economic value (the "Expected Value"), as determined by reference to an economic model. This economic model may determine the Expected Value of the portfolio by calculating any fees along with the expected interest and principal payments of the investment over time, as modified by certain economic and non-economic risk factors. This economic model may be implemented by a processing system having software specifically adapted for such modeling. Because of certain risk factors, particularly non-economic risk factors and market inefficiencies or irregularities, the Book Value of the Acquired Portfolio may be less than its Expected Value, or its true economic value. The true economic value of the Acquired Portfolio may be the actual economic value of the portfolio realized over its term and upon maturity or, as a result of any default, the recovery value. This true economic value may be determined as the aggregate of the principal payments of the Acquired Portfolio over its term and the proceeds of recoveries in the event of a default on a FIS.

Under the agreement, the Provider agrees to purchase the Acquired Portfolio for an agreed-upon value (the "Deal Value"). The Deal Value may be determined with reference to the Expected Value and Book Value. In addition, the Deal Value may be substantially equal to the Expected Value, although risks and other party considerations may cause the Deal Value to be more or less.

In conjunction with the agreement to purchase the Acquired Portfolio, the Client makes a non-recourse loan (the "Loan") to the Provider. The non-recourse loan is generally secured by the Acquired Portfolio. Accordingly, the amount of the non-recourse loan (the "Loan Amount") is a portion of the Deal Value as determined according to an agreed loan-to-value rate. Alternatively, the loan may be backed by other agreed-upon assets or securities. The Loan is compensated at an agreed-upon rate (the "Loan Interest"), which may be set with reference to a major interest rate index plus a fixed or variable spread. For example, the Loan Interest may be equal to the 3 or 6 month LIBOR, Federal Reserve, or Prime Interest Rate, plus an additional 0.25% to 2.5% fixed or variable spread, or any other spread therebetween. The term and ultimate payment under the Loan may be consistent with the maturity date of the underlying asset, generally the Acquired Portfolio.

Because the Loan Amount is only a portion of the actual Deal Value, or purchase price of the asset, the Provider contributes its own capital to complete the purchase. This capital may be raised through the issuance of certain equity securities (the "Provider Equity"), which may be purchased by various investors, and which may carry with them a characteristic interest rate, fee and dividend arrangement. The Provider Equity may have basic equity payment arrangements that consist of a base dividend and a risk premium dividend (the "Base Equity Payments"). The base dividend can be indexed to a major interest rate index plus a fixed spread, such as from 0.25% to 1.25%. The risk premium may be based on a percentage of the face value of the Provider Equity, such as from 3.0% to 7.0%. The Provider Equity may also provide variable dividends, which may include all or a portion of payments from the acquired portfolio remaining after servicing Loan payments and base equity payments.

After the sale and loan are completed, the Client will, in most instances, record as a profit the amount that the Deal Value exceeds the Book Value of the Acquired Portfolio, according to the date of settlement. The Client, in most instances, will further be able to record an increase in risk-based capital as a result of the sale. Also, the Client in most instances will be permitted to record and report the Loan in a HTM account.

Over the term of the agreement, the Loan is repaid by the Provider on a senior, non-recourse basis from the maturity or default recovery proceeds of the Acquired Portfolio (the "Aggregate Principal Payments" or "APP"). Where the APP of the Acquired Portfolio is less than the Loan Amount, a deficit exists and the Loan is not repaid in full. However, where the APP of the Acquired Portfolio is greater than the Deal Value, an excess exists. With an excess of proceeds, the Loan is repaid in full and the Client and Provider may engage in profit sharing. For the profit sharing, the Client receives an agreed portion of the excess, and the Provider retains the balance or distributes its portion according to Provider Equity obligations.

According to the terms of the agreement, the Acquired Portfolio is held in trust to its maturity (or earlier default) by a Security Trustee, which may be the Provider or a third-party. The Security Trustee directs principal and interest payments from the Acquired Portfolio to the Provider, investors, and the Client in accordance with service obligations. Generally, over the life of the Acquired Portfolio the service obligations are, in order of priority: management fees, accrued or unpaid Loan interest and Base Equity Payments, Loan early termination fees (if any), Loan principal, Provider Equity principal, and excess payments. Other priority arrangements may be made according to the will of the parties and with regard to other party financial obligations.

The agreement may also provide for early termination by the Client or the Provider. Prior to the final maturity of the Acquired Portfolio, the loan may be terminated subject to pre-agreed terms and early termination fees. Where the loan is terminated by the Client, the Acquired Securities may be sold in order to repay the loan, less any fees which may be directly recouped from the sale by the Provider. Additionally, the Provider may terminate the agreement by sale of the Acquired Securities according to pre-agreed terms and subject to any agreed early loan termination penalties.

Additional aspects of the individual asset sale and loan program are apparent in view of the following example, which is for explanatory purposes only and is not in any way intended to limit the scope of the program.

Individual Asset Sale and Loan Example 1

In the present example, the Client and Provider enter into an individual asset sale and loan agreement whereby the Loan Amount is 80 and the Deal Value is 90. The Loan Interest is indexed to the 3-month LIBOR plus a spread of 0.25% per annum on the outstanding Loan Amount, payable quarterly in arrears to the Client. All principal collected from the Acquired Portfolio, plus the sales proceeds of agreed securities sales, are to be used by the Provider to reduce the outstanding Loan Amount. The Loan payments are to be supported solely by the Acquired Portfolio. In addition to the loan amount of 80, the Provider agrees to contribute 10 towards the purchase of the Acquired Portfolio, which it raises from third-party investors through the issuance of Provider Equity. The Provider Equity has Base Equity Payments with a base dividend of the 3-month LIBOR plus 0.5%, and a risk premium of 5.0% of the face value of the Provider Equity. The agreement also provides that where the APP exceeds the Deal Value, the Client will receive 40% of the excess with the remaining portion going to the Provider. The expiration date of the agreement is the final maturity date of the Acquired Portfolio FIS.

Referring to FIG. 1, at inception the Client 102 makes the Loan to the Provider 104, who then purchases the Acquired Portfolio 106 from the Client 102. Control of the Acquired Portfolio 106 is then transferred to the Security Trustee 108. Subsequently, the Acquired Portfolio 106 serves as collateral for the Loan and secures the Provider's obligations under the agreement.

Figure 2:
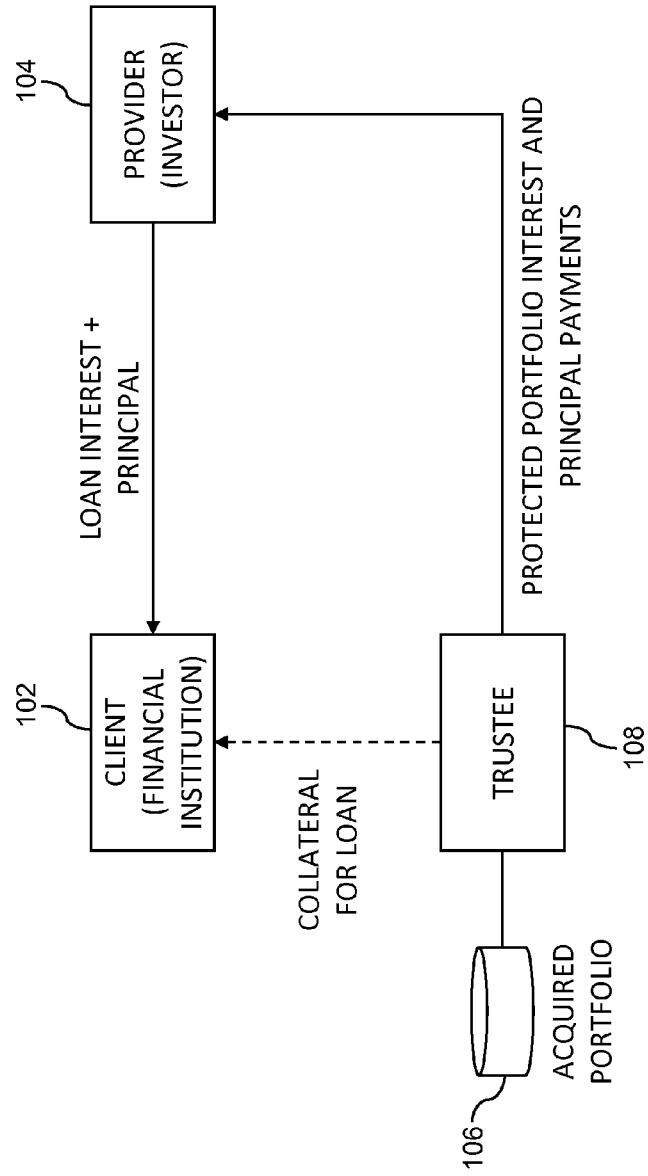
FIG. 2 is a block diagram of ongoing principal transactions over the term of an individual asset sale and loan program, according to an embodiment.

Referring to FIG. 2, over the term of the program the Provider 104 makes loan interest and principal payments to the Client 102 in accordance to the terms of the Loan. The Security Trustee 108 directs cash received from the principal payments and/or recovery cash flows from the Acquired Portfolio 106 to the Client 102. Accordingly, the loan interest and principal payments due to the Client may be paid by the Provider directly from the returns of the Acquired Portfolio. Alternatively, the Security Trustee may calculate the principal and interest payments and pay them directly to the Client from the Acquired Portfolio returns, with the balance of the returns going to the Provider.

Figure 3:
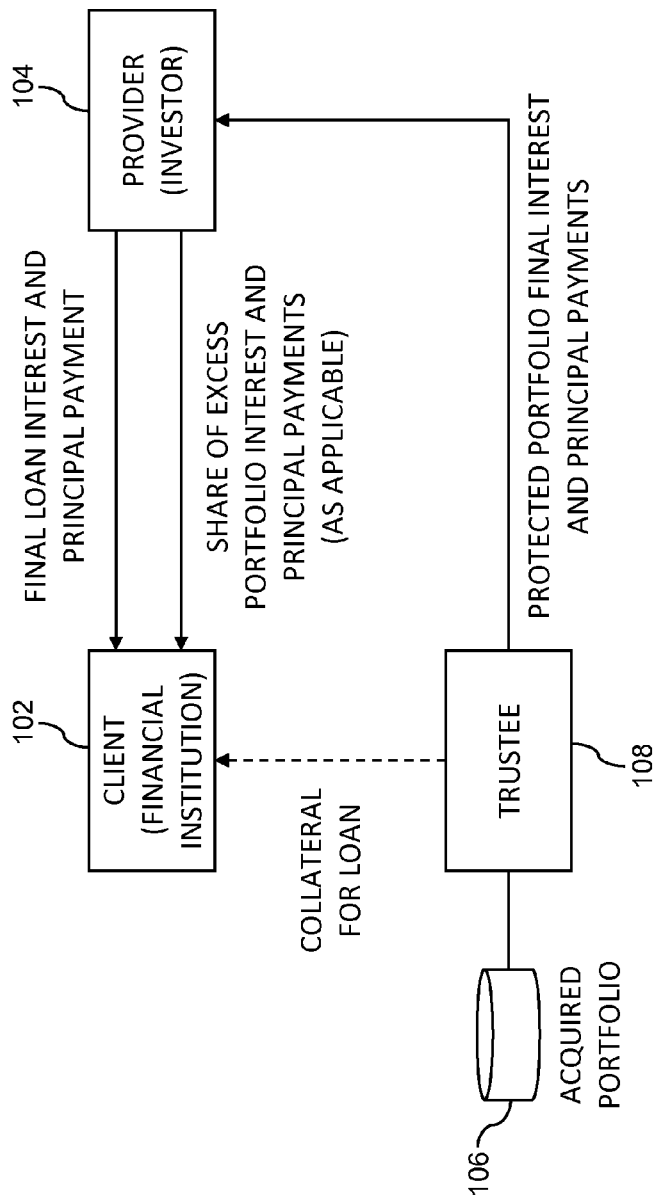
FIG. 3 is a block diagram of principal transactions at the maturity of an individual asset sale and loan program, according to an embodiment.

Referring to FIG. 3, at the expiration date of the program, the Security Trustee 108 determines if there is a remaining loan balance and, if so, notifies the Client 102 of a default on the Loan. If there is no remaining balance on the Loan, the remaining APP is to be used to repay the Provider Equity. In addition, if there is any excess APP over the Deal Value, the Client 102 receives 40% of the excess and the Provider 104 keeps the remaining balance. In accordance with the above terms in the example agreement, Table 1 illustrates potential payments for several APP scenarios:

TABLE 1

Program Payment Illustration

| APP | Impact to Client | Impact to Provider |
|---|---|---|
| 70 | Deficit of 10; Client loan loss of 10 | No repayment of Provider Equity; loss of 10 |

TABLE 1-continued

Program Payment Illustration

| APP | Impact to Client | Impact to Provider |
|---|---|---|
| 85 | Loan fully repaid | Partial payment of Provider Equity; loss of 5 |
| 90 | Loan fully repaid | Provider Equity fully repaid |
| 95 | Profit sharing and excess payment of 40% of 5 to Client | Provider Equity fully repaid; Excess payment of 60% of 5 to Provider |

Individual Asset Sale and Loan Example 2

Figure 4:
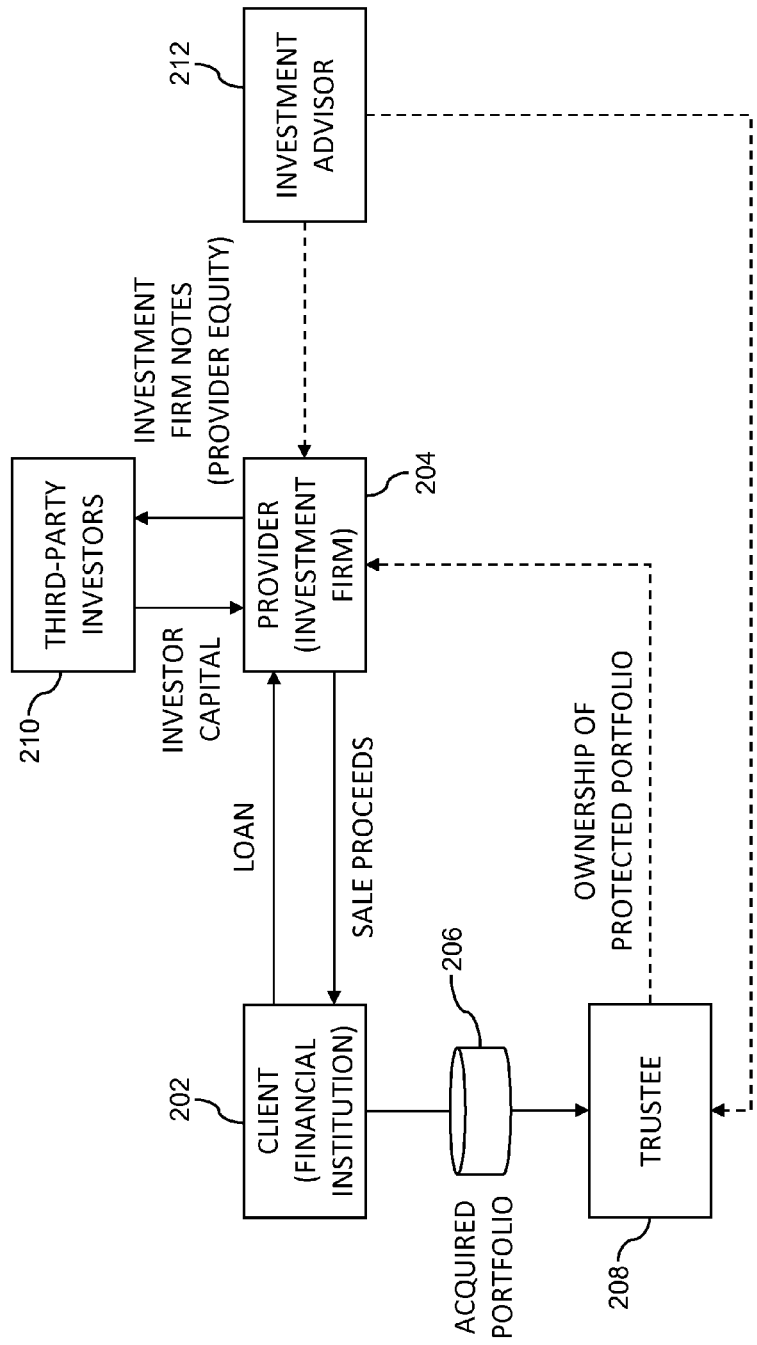
FIG. 4 is a block diagram of principal transactions at the inception of an individual asset sale and loan program featuring third-party investors and an investment advisor, according to an embodiment.

In another example, the Client and Provider enter into an individual asset sale and loan agreement according to the face value of the asset. At the outset of the program, the face value of the Acquired Portfolio is determined to be 1,000, and the book value (transferability value) is determined to be 800. By agreement of the parties the Loan Amount is determined to be 800 and the Deal Value is 900. The Loan Interest is indexed to the 3-month LIBOR plus a spread of 0.25% per annum on the outstanding Loan Amount, payable quarterly in arrears to the Client. All principal collected from the Acquired Portfolio, plus the sales proceeds of agreed securities sales, are to be used by the Provider to reduce the outstanding Loan Amount. The Loan payments are to be supported solely by the Acquired Portfolio. In addition to the loan amount of 800, the Provider agrees to contribute 100 towards the purchase of the Acquired Portfolio, which it raises from third-party investors through the issuance of Provider Equity. The Provider Equity has Base Equity Payments with a base dividend of the 3-month LIBOR plus 0.5%, and a risk premium of 5.0% of the face value of the Provider Equity. The agreement also provides that where the APP exceeds the Deal Value, the Client will receive 40% of the excess with the remaining portion going to the Provider. The expiration date of the agreement is the final maturity date of the Acquired Portfolio FIS. Referring to FIG. 4, at inception the Client 202 makes the Loan to the Provider 204, who then purchases the Acquired Portfolio 206 from the Client 202. Control of the Acquired Portfolio 206 is then transferred to the Security Trustee 208. Subsequently, the Acquired Portfolio 206 serves as collateral for the Loan and secures the Provider's obligations under the agreement. In addition, at or prior to inception the Provider issues the Provider Equity which is purchased by third-party investors 210.

Figure 5:
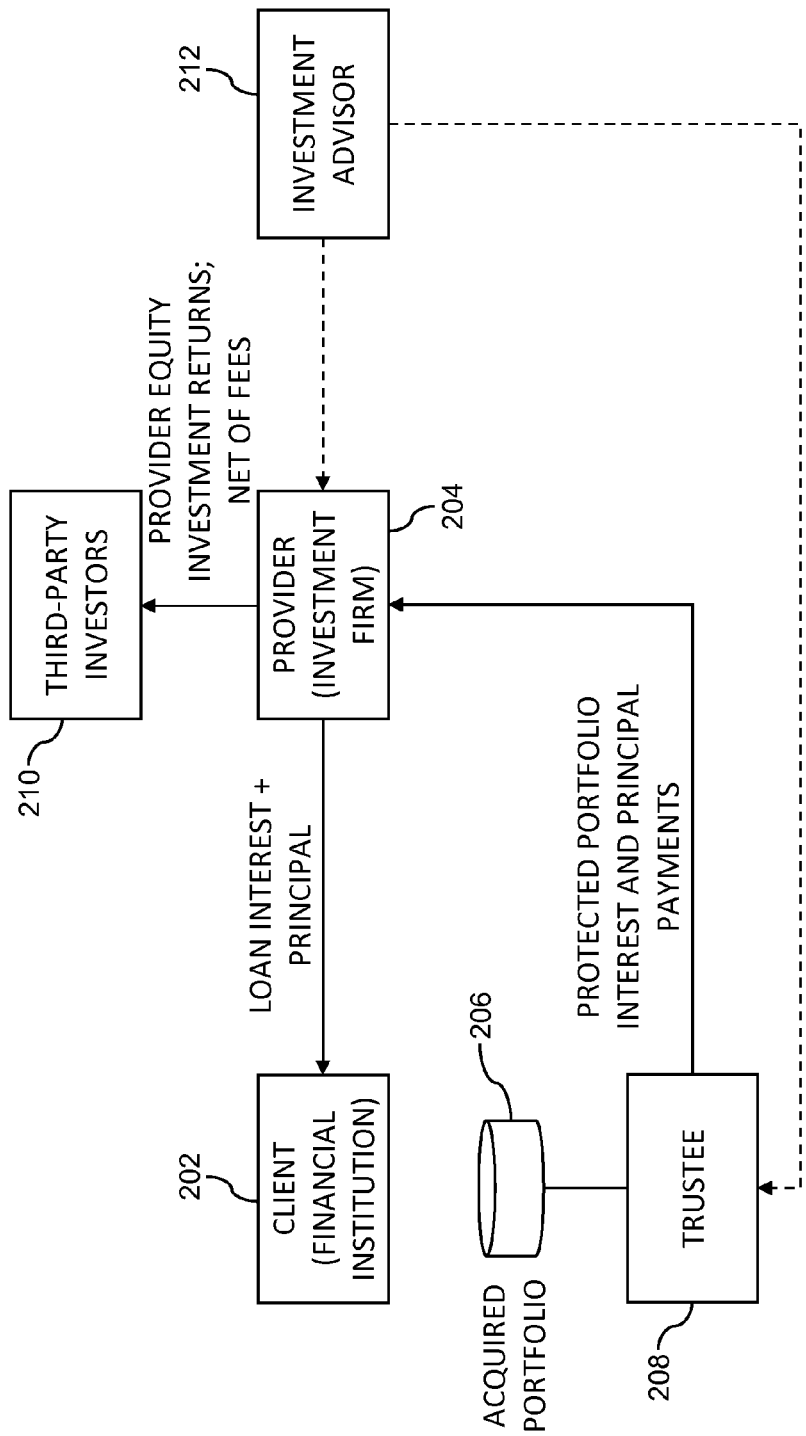
FIG. 5 is a block diagram of ongoing principal transactions over the term of an individual asset sale and loan program featuring third-party investors and an investment advisor, according to an embodiment.

Referring to FIG. 5, over the term of the program the Provider 204 makes loan interest and principal payments to the Client 202 in accordance to the terms of the Loan. The Security Trustee 108 directs cash received from the principal payments and/or recovery cash flows from the Acquired Portfolio 206 to the Client 202. Accordingly, the loan interest and principal payments due to the Client may be paid by the Provider directly from the returns of the Acquired Portfolio. Alternatively, the Security Trustee may calculate the principal and interest payments and pay them directly to the Client from the Acquired Portfolio returns, with the balance of the returns going to the Provider. In addition, over the tem of the program the Provider 204 pays payments and dividends on the Provider Equity to the third-party investors 210. The Acquired Portfolio returns remaining after servicing the Loan are used by the Investor to fulfill the Provider Equity obligations to the third-party investors.

Figure 6:
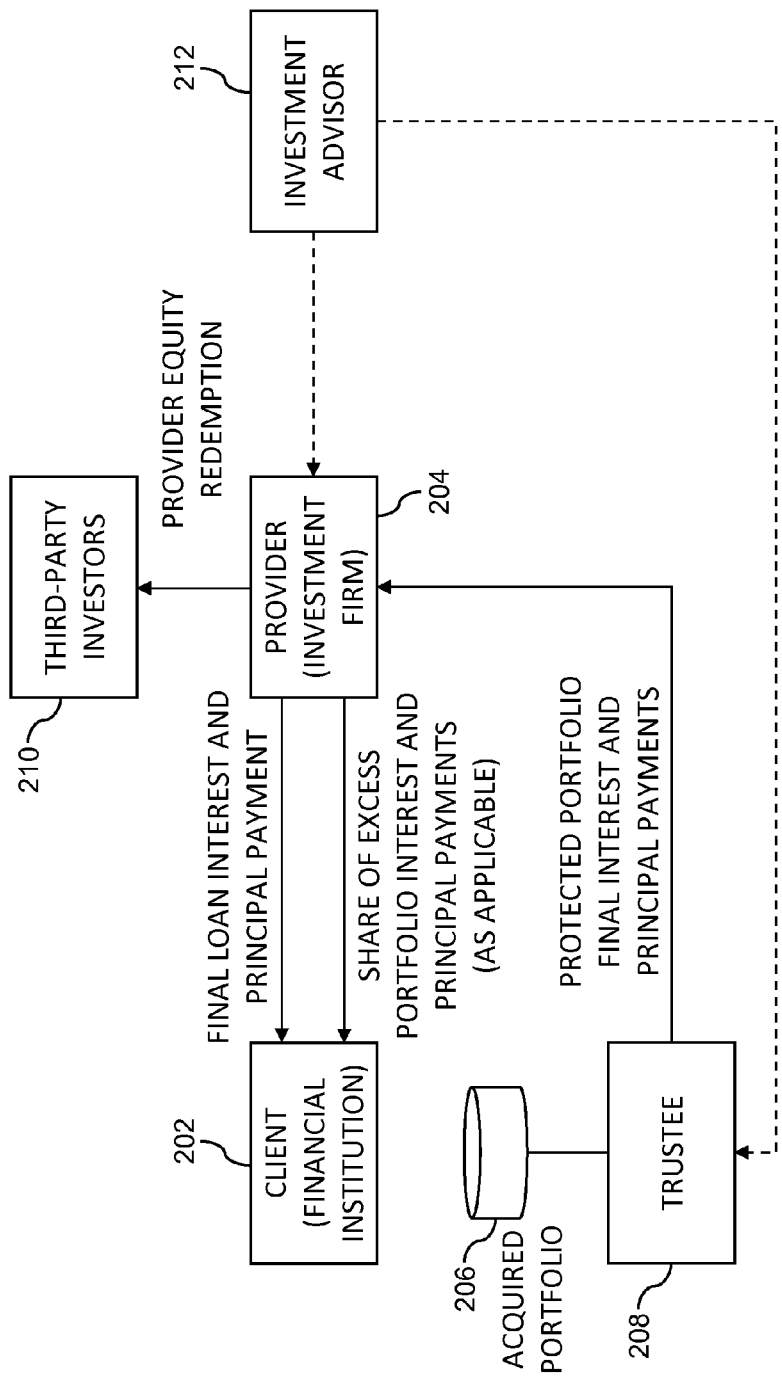
FIG. 6 is a block diagram of principal transactions at the maturity of an individual asset sale and loan program featuring third-party investors and an investment advisor, according to an embodiment.
Figure 10:
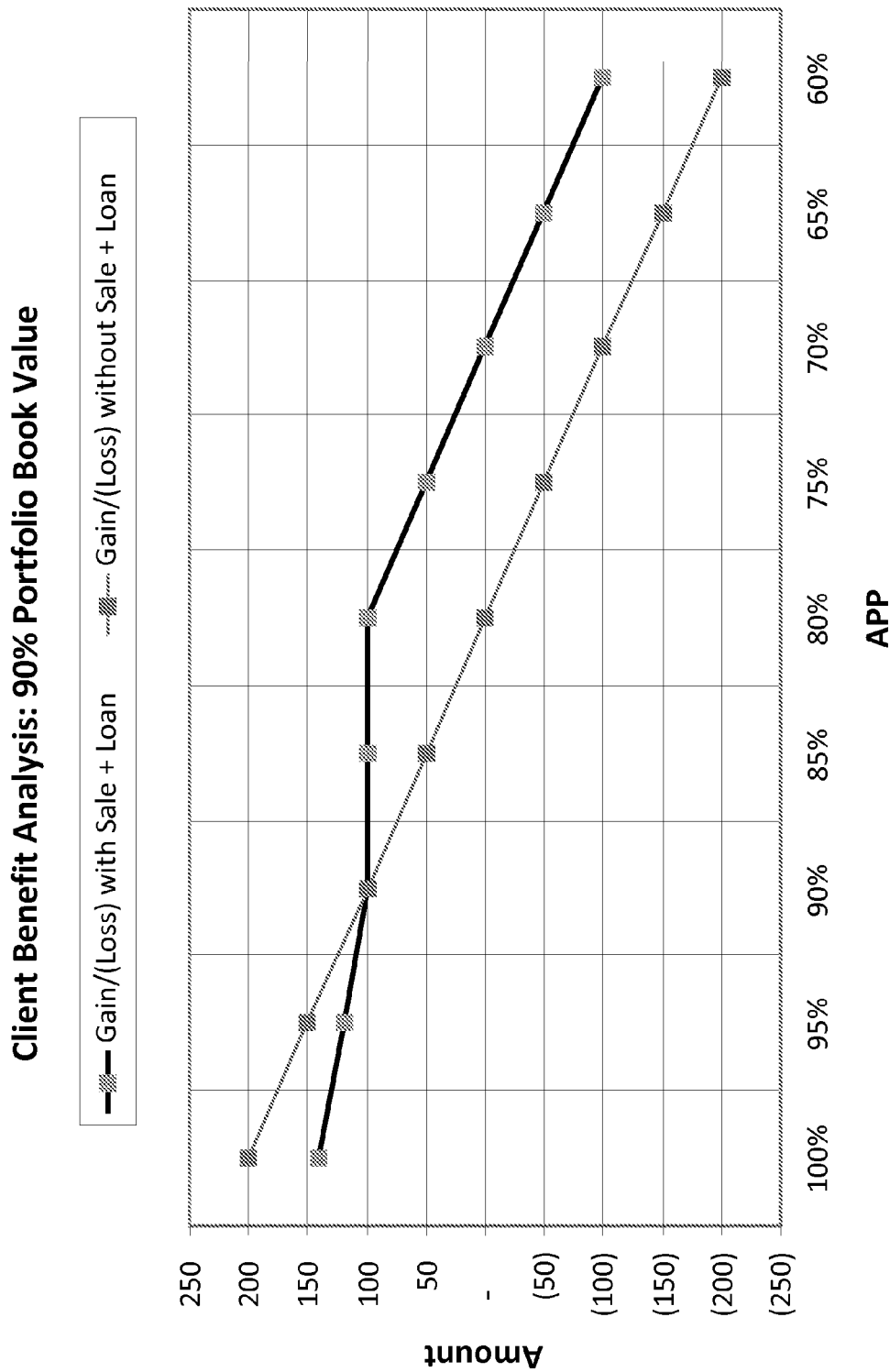
FIG. 10 is a chart illustrating for a client financial institution the benefit analysis for a given portfolio with and without a risk transference program and for various aggregate principal payment scenarios.
Figure 11:
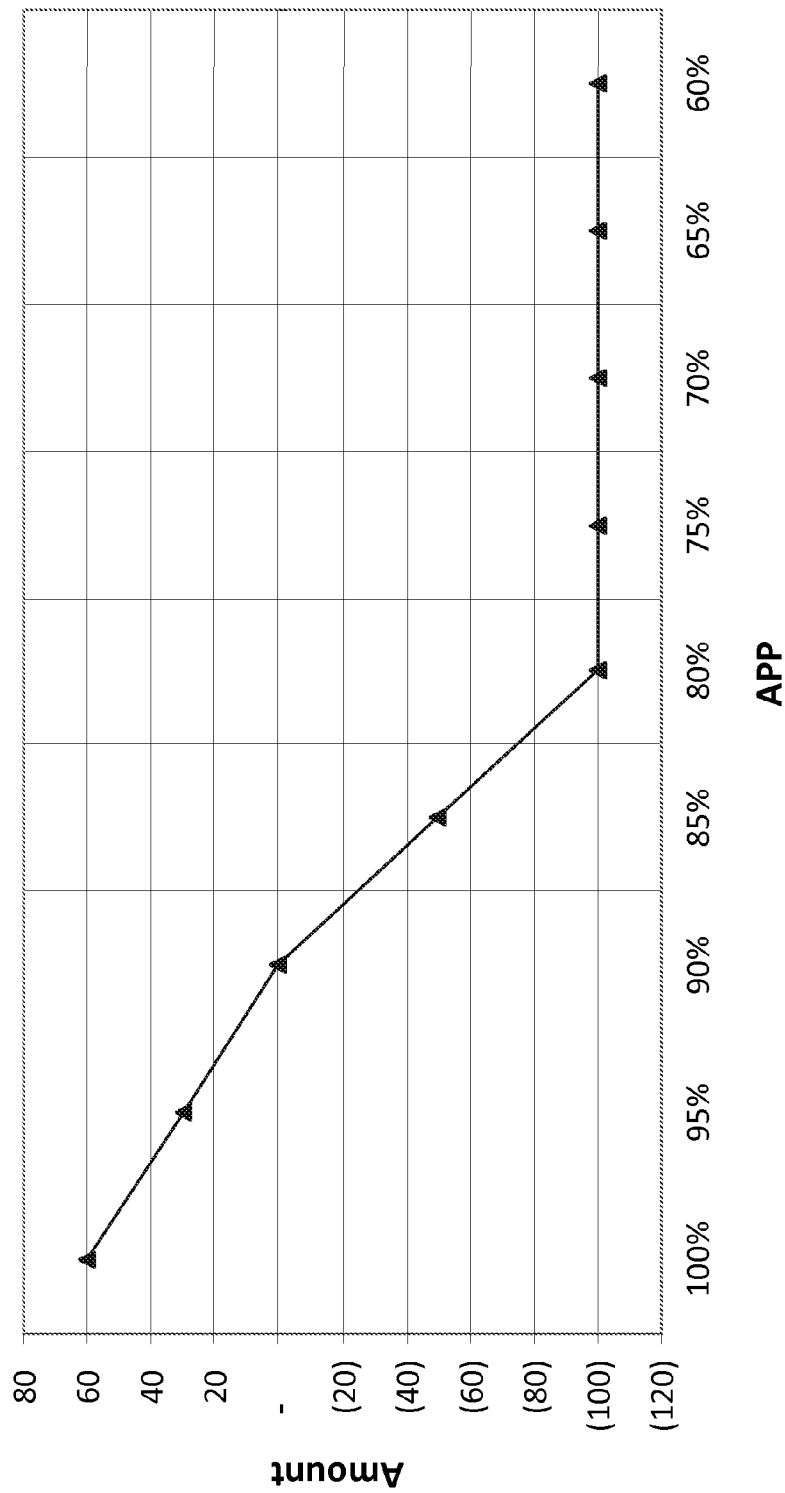
FIG. 11 is a chart illustrating for a provider investment firm the benefit analysis for a given portfolio with a risk transference program and for various aggregate principal payment scenarios.

Referring to FIG. 6, at the expiration date the Security Trustee 208 determines if there is a remaining Loan balance and, if so, notifies the Client 202 of a default on the Loan. If there is no remaining balance on the Loan, the remaining APP is to be used to repay the Provider Equity. In addition, if there is any excess APP over the Deal Value, the Client 202 receives 40% of the and the Provider 204 keeps the remaining balance. In accordance with the above terms in the example agreement, Table 1 illustrates potential payments for several APP scenarios:

Tables 2 and 3 provide illustrations of the economics for the Client 202 and Provider 204, respectively, with respect to the terms in the example agreement and according to various APP scenarios. In addition, FIG. 10 provides an illustration of the Client economics for the example according to various APP scenarios, and FIG. 11 provides an illustration of the Provider economics for the example according to various APP scenarios.

processing systems may be linked via the network in order to coordinate the determination of variables for the share program.

The memory 410 has stored therein an operating system 412 and a multiplicity of software programs 414 designed to operate on the operating system 412. The software programs include: a program 416 that calculates the principal payments of the Acquired Portfolio 416, a program 418 that calculates the interest of the Acquired Portfolio 418, a program 420 that calculates the APP of the Acquired Portfolio on an ongoing basis, a program 422 that models the Gap risk associated with the Acquired Portfolio, a program 424 that models the program variables under various scenarios, and a program 426 that calculates the payments due each party under the terms of the program.

TABLE 2

Illustration of Client Economics

| | APP Scenarios | | | | | | | | |
| --- | --- | --- | --- | --- | --- | --- | --- | --- | --- |
| | 100% | 95% | 90% | 85% | 80% | 75% | 70% | 65% | 60% |
| Sale Proceeds | 900 | 900 | 900 | 900 | 900 | 900 | 900 | 900 | 900 |
| Loan Amount | 800) | (800) | (800) | (800) | (800) | (800) | (800) | (800) | (800) |
| Gain on Sale | 100 | 100 | 100 | 100 | 100 | 100 | 100 | 100 | 100 |
| Loan payments from Provider | 800 | 800 | 800 | 800 | 800 | 750 | 700 | 650 | 600 |
| Share of Excess | 40 | 20 | — | — | — | — | — | — | — |
| Net to Client | 940 | 920 | 900 | 900 | 900 | 850 | 800 | 750 | 700 |
| Net to Client without Sale and Loan | 1,000 | 950 | 900 | 850 | 800 | 750 | 700 | 650 | 600 |
| Client benefit/(cost) | 140 | 120 | 100 | 100 | 100 | 50 | — | (50) | (100) |
| Client benefit/(cost) without Program | 200 | 150 | 100 | 50 | — | (50) | (100) | (150) | (200) |

TABLE 3

Illustration of Provider Economics

| | APP Scenarios | | | | | | | | |
| --- | --- | --- | --- | --- | --- | --- | --- | --- | --- |
| | 100% | 95% | 90% | 85% | 80% | 75% | 70% | 65% | 60% |
| Provider Equity | (100) | (100) | (100) | (100) | (100) | (100) | (100) | (100) | (100) |
| Loan Amount | (800) | (800) | (800) | (800) | (800) | (800) | (800) | (800) | (800) |
| Acquired Portfolio Purchase | (900) | (900) | (900) | (900) | (900) | (900) | (900) | (900) | (900) |
| APP to Provider at Maturity | 1,000 | 950 | 900 | 850 | 800 | 750 | 700 | 650 | 600 |
| Repayment of Provider Equity from APP | 100 | 100 | 100 | 50 | — | — | — | — | — |
| Excess payments | 60 | 30 | — | — | — | — | — | — | — |
| Loan payments to Client | (800) | (800) | (800) | (800) | (800) | (750) | (700) | (650) | (600) |
| Provider net gain/(loss) | 60 | 30 | — | (50) | (100) | (100) | (100) | (100) | (100) |

Figure 9:
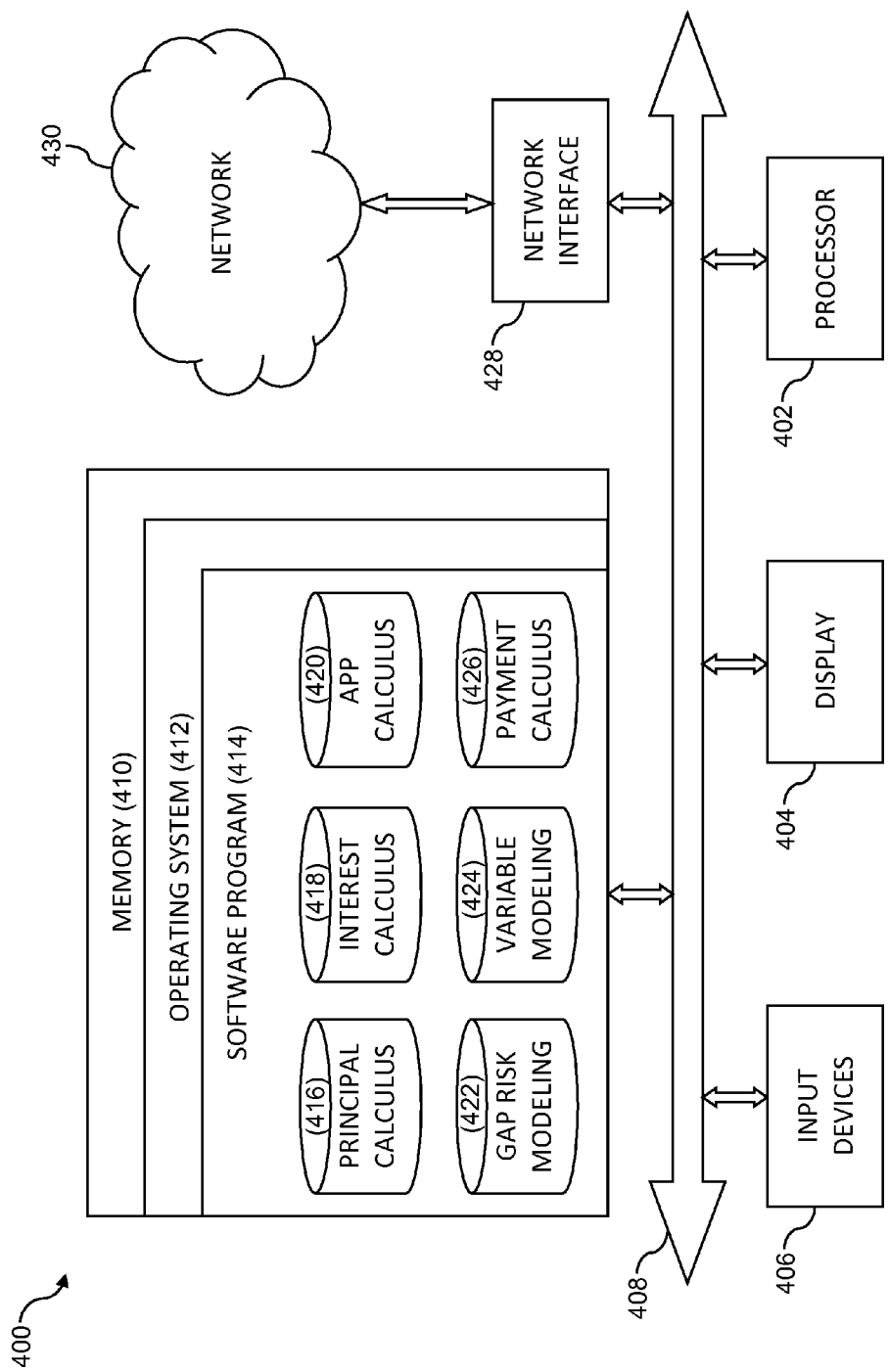
FIG. 9 is a schematic diagram of a processing system for implementing portions of the asset purchase contingent revolving term loan program and individual asset sale and loan program, according to an embodiment.

Referring to FIG. 9, the variables for the asset sale and loan program are calculated using a processing system 400 that has software adapted to determining these values. The processing system 400 has a processor 402 for executing instructions from the memory 410, processing input from the input devices 406, communicating with the display 404, and processing data from any other peripherals. The processor 402, memory 410, input devices 406, display 404, network interface 428, and other peripherals may be communicably coupled via a single bus 408. Alternatively, these and other components may be joined by multiple buses, or several individual dedicated buses. The network interface 428 may communicably couple the processing system 400 to an external network of other processing systems. In addition, multiple Asset Purchase Contingent Revolving Term Loan Program Under the asset purchase contingent revolving term loan program, two parties enter into an agreement whereby the first party makes a revolving term loan to the second party. The second party uses the loan proceeds and its equity initially to provide financing to the repo market according to agreed criteria. Over time the second party uses the loan, its Provider Equity, and proceeds from maturing repos to acquire assets to be used as collateral for the loan. The revolving portion of the loan may be contingent on the second party acquiring a minimum portion of the first party's selected assets before a given date. After acquiring assets, the loan is repaid on a senior and non-recourse basis from maturity payments of acquired assets, sales of acquired assets, default recovery proceeds of acquired assets, and continued proceeds by maturing repos. Gap losses are absorbed by the second party. However, where the securities market transactions and acquired assets securing the loan default, in the aggregate, for less than the loan amount, the loan is not repaid in full.

The above asset purchase contingent revolving term loan agreement may be entered into by a financial institution (the "Client") that desires to have flexibility in transferring specific FIS or FIS Portfolios to an investment firm (the "Provider"), and subsequently re-characterizing the residual exposures associated with these assets as security for its loan in HTM accounts. By agreement, the Client provides a non-recourse revolving term loan (the "Revolving Loan") where the amount of the loan (the "Revolving Loan Amount") is in accordance with a maximum loan-to-value ratio (the "Revolving Loan LTV"). The Provider provides its own capital to meet the Revolving Loan LTV requirements, which it may raise through the issuance and sale of capital notes (the "Provider Equity") to third-party investors (the "Investors"). By agreement, the proceeds from the Provider and from the Revolving Loan are held in trust by the Provider or by a third-party trustee (the "Security Trustee").

The Revolving Loan is compensated at an agreed-upon rate (the "Revolving Loan Interest"), which may be set with reference to a major interest rate index plus a fixed or variable spread. For example, the Revolving Loan Interest may be equal to the 3 or 6 month LIBOR, Federal Reserve, or Prime Interest Rate, plus an additional 0.25% to 2.5% fixed or variable spread, or any other spread therebetween. The Revolving Loan may be set to expire annually in the absence of any purchased Client securities, or otherwise may be set to correspond to the final maturity date of acquired securities.

Initially, the proceeds in the trust are utilized to enter into reverse repo transactions (the "Reverse Repos") and to acquire repo securities. The repo securities may be selected based on agreed criteria, such as, but not limited to, the margin ("haircut"), rate, price, term, rating and type of security. The repo securities act as collateral for the Revolving Loan and may be utilized to reduce the initial revolving loan spread.

Over the course of the agreement, the Provider uses the Revolving Loan and the proceeds from maturing reverse repos to acquire a portfolio of securities (the "Acquired Portfolio") from the Client, or other assets and securities as agreed upon by both parties. The securities in the Acquired Portfolio may serve as collateral for the Revolving Loan. To the extent that the acquisition of securities in the Acquired Portfolio affects the Revolving Loan collateral, the Revolving Loan Interest may be adjusted. For example, where the acquired securities displace repo collateral having a higher market value than the acquired securities, the spread of the Revolving Loan Interest may be gradually increased according to agreed criteria, or according to a schedule.

The Revolving Loan is repaid on a senior, non-recourse basis from sales of agreed assets in the Acquired Portfolio, the maturity payments and default recovery proceeds of assets in the Acquired Portfolio (the "Aggregate Principal Payments" or "APP"), and by maturing reverse repos. Where defaults under the Reverse Repos, sale proceeds, and APP are—in the aggregate—less than the Revolving Loan Amount, there is a deficit and the Revolving Loan is repaid at less than the full amount. However, where the principal collected in relation to the Reverse Repos, sales of assets in the Acquired Portfolio, and APP exceed payments necessary to cover Revolving Loan Interest and to otherwise necessarily reduce the principal of the Revolving Loan, there is an excess available. This excess will be applied first to repay the Provider Equity; and then, once that has been repaid, the Client may participate in the remaining excess amount in accordance with a profit sharing agreement with the balance going to the Provider Equity.

Additional aspects of the asset purchase contingent revolving term loan program are apparent in view of the following example, which is for explanatory purposes only and is not in any way intended to limit the scope of the program.

Asset Purchase Contingent Revolving Term Loan Agreement Example

Figure 7:
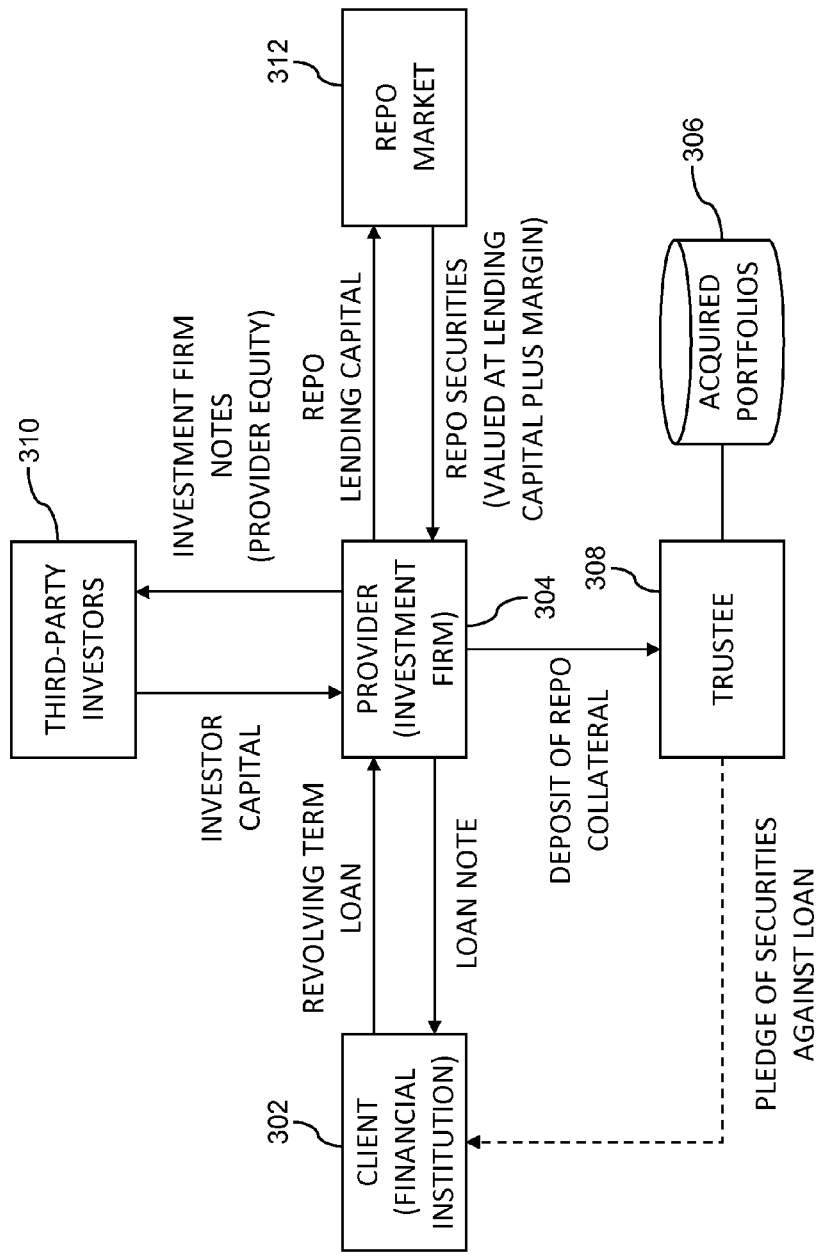
FIG. 7 is a block diagram of principal transactions at the inception of an asset purchase contingent revolving term loan program, according to an embodiment.

Referring to FIG. 7, in the present example the Client 302 and Provider 304 enter into an asset purchase contingent revolving term loan agreement. Initially, the Provider 304 raises capital proceeds of $1.0 billion through the issuance and sale of Provider Equity to third-party investors 310. The Provider Equity has Base Equity Payments with a base dividend of the 6-month LIBOR plus 0.5%, and a risk premium of 5.0% of the face value of the Provider Equity. Based on the Revolving Loan LTV and according to the terms of the agreement, the Client 302 provides a Revolving Loan Amount of $10.0 billion. The Revolving Loan Interest is indexed to the 6-month LIBOR plus a spread of 0.25% per annum on the outstanding Loan Amount, payable quarterly in arrears to the Client.

Initially, the Provider 304 takes the $1.0 billion from its Provider Equity and the $10.0 billion from the Revolving Loan and enters the repo market 312 as a repo lender. Using the $11.0 billion, the Provider 304 enters into Reverse Repos that, with an average haircut of 5%, result in the acquisition of approximately $11.55 billion in securities, which may be held in trust by the Security Trustee 308, and which are pledged as collateral against the Revolving Term Loan.

Figure 8:
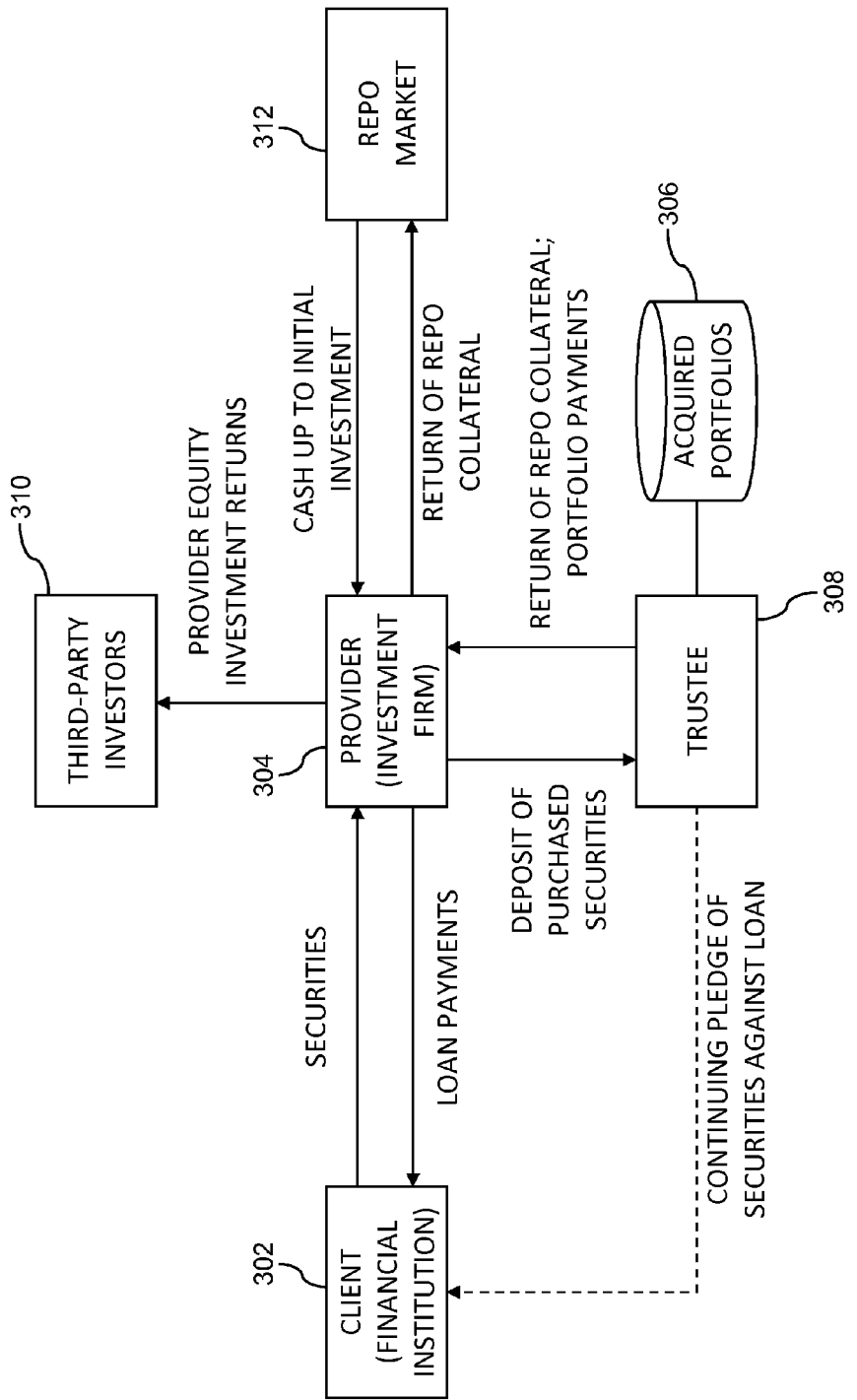
FIG. 8 is a block diagram of ongoing principal transactions over the term of an asset purchase contingent revolving term loan program, according to an embodiment.

Referring to FIG. 8, over time the Provider 304 utilizes the proceeds from maturing Reverse Repos and from latent loan capital to acquire securities and other assets to be placed in the Acquired Portfolio 306, at a total purchase price of up to $11.0 billion. For each security or principal-bearing asset acquired by the Provider 304 from the Client 302, the Client 302 records a profit or loss on the sale, and essentially converts the asset to a loan which is anticipated to be held in an HTM account. Per the agreement, the Provider 304 manages the Revolving Loan Interest, outstanding Revolving Loan Amount, principal payments, sales and other proceeds. The Provider 304 will assume up to $1.0 billion of Gap risk in any securities.

While the invention has been described in terms of several preferred embodiments, it should be understood that there are many alterations, permutations, and equivalents that fall within the scope of this invention. It should also be noted that there are alternative ways of implementing both the process and apparatus of the present invention. For example, steps do not necessarily need to occur in the orders shown in the accompanying figures, and may be rearranged as appropriate. It is therefore intended that the appended claim includes all such alterations, permutations, and equivalents as fall within the true spirit and scope of the present invention.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

The use of individual numerical values are stated as approximations as though the values were preceded by the word "about" or "approximately." Similarly, the numerical values in the various ranges specified in this application, unless expressly indicated otherwise, are stated as approximations as though the minimum and maximum values within the stated ranges were both preceded by the word "about" or "approximately." In this manner, variations above and below the stated ranges can be used to achieve substantially the same results as values within the ranges. As used herein, the terms "about" and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about" or "approximately" will serve to broaden a particular numerical value or range. Thus, as a general matter, "about" or "approximately" broaden the numerical value. Also, the disclosure of ranges is intended as a continuous range including every value between the minimum and maximum values plus the broadening of the range afforded by the use of the term "about" or "approximately." Thus, recitation of ranges of values herein are merely intended to serve as a shorthand method of referring individually to each separate value falling within the range, unless otherwise indicated herein, and each separate value is incorporated into the specification as if it were individually recited herein.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

We claim:

1. A method for implementing an asset sale and loan program for quantifying and transferring non-economic risk between a first party and a second party, said method comprising:

receiving data representing an asset belonging to the first party, wherein the data includes a book value of the asset and principal payments of the asset;

generating an expected value of the asset based on the data representing the asset;

determining a deal value based on the book value and the expected value, wherein the second party purchases the asset from the first party for the deal value;

calculating an equity amount based on the deal value and the loan amount, wherein the second party contributes the equity amount towards the purchase of the asset, determining a loan amount based on the deal value such that the loan amount is less than the deal value, wherein the first party makes a loan to the second party for the loan amount, and wherein the second party makes periodic payments towards the loan from principal payments of the asset;
receiving a term date for the loan;
determining aggregate principal payments (APP) of the asset as of the term date; and
indicating whether the APP exceeds the loan amount;
calculating any portion of the APP exceeding the deal value ("excess payments");
indicating any portion of the excess payments due to the first party under the program,
providing to the first party a portion of any excess payments due to the first party; and
wherein the steps of receiving data representing an asset, generating an expected value, determining a deal value, determining a loan amount, determining APP, calculating any portion of the APP exceeding the deal value, and providing to the first party a portion of any excess payments are performed by a computer.

2. The method of claim 1 wherein calculating an economic value of the asset comprises:
performing a risk analysis based on the data representing the asset; and
determining the net present value of expected future principal payments according to the risk analysis.

3. The method of claim 1 wherein the data representing the asset further includes a maturity date of the asset, and wherein the term date for the loan is the maturity date of the asset.

4. The method of claim 1 further comprising the steps of:
determining a loan interest rate; and
calculating a loan interest value, wherein the periodic payments towards the loan include the loan interest value.

5. The method of claim 1 wherein the second party raises the equity amount by issuing equity shares having a face value to third-party investors.

6. The method of claim 5 further comprising the step of calculating a equity share payment value having a base dividend based on a major interest rate index, wherein the second party periodically pays the equity share payment to the third-party investors.

7. The method of claim 6 wherein the equity share payment also has a risk premium dividend that is based on a portion of the face value of the equity shares.

8. The method of claim 1 further comprising the step of determining a termination fee for the early termination of the loan, wherein the first party is permitted under the program to cancel the program prior to the term date by paying the second party the termination fee.

9. A non-transitory computer-readable medium for implementing an asset sale and loan program for quantifying and transferring non-economic risk between a first party and a second party, said computer-readable medium bearing a computer program containing instructions which, when implemented by a computer, cause the computer to execute the steps of:
receiving data representing an asset belonging to the first party, wherein the data includes a book value of the asset and principal payments of the asset;
generating an expected value of the asset based on the data representing the asset;
determining a deal value based on the book value and the expected value, wherein the second party purchases the asset from the first party for the deal value;
determining a loan amount based on the deal value such that the loan amount is less than the deal value, wherein the first party agrees makes a loan to the second party for the loan amount, and wherein the second party makes periodic payments towards the loan from the principal payments of the asset;
calculating an equity amount based on the deal value and the loan amount, wherein the second party contributes the equity amount towards the purchase of the asset,
receiving a term date for the loan;
determining aggregate principal payments (APP) of the asset as of the term date;
displaying whether the APP exceeds the loan amount;
calculating any portion of the APP exceeding the deal value ("excess payments") due under the program; and
indicating any portion of the excess payments due under the program, wherein the second party provides to the first party a portion of any excess payments.

10. The non-transitory computer-readable medium of claim 9 wherein calculating an economic value of the asset comprises:
performing a risk analysis based on the data representing the asset; and
determining the net present value of expected future principal payments according to the risk analysis.

11. The non-transitory computer-readable medium of claim 9 wherein the data representing the asset further includes a maturity date of the asset, and wherein the term date for the loan is the maturity date of the asset.

12. The non-transitory computer-readable medium of claim 9 wherein the computer program further contains instructions for:
determining a loan interest rate; and
calculating a loan interest value, wherein the periodic payments towards the loan include the loan interest value.

13. The non-transitory computer-readable medium of claim 9 wherein the second party raises the equity amount by issuing equity shares having a face value to third-party investors.

14. The non-transitory computer-readable medium of claim 13 wherein the computer program further contains instructions for calculating a equity share payment value having a base dividend based on a major interest rate index, wherein the second party periodically pays the equity share payment to the third-party investors.

15. The non-transitory computer-readable medium of claim 14 wherein the equity share payment also has a risk premium dividend that is based on a portion of the face value of the equity shares.

16. The non-transitory computer-readable medium of claim 9 wherein the computer program further contains instructions for determining a termination fee for the early termination of the loan, wherein the first party is permitted under the asset sale and loan program to cancel the asset sale and loan program prior to the term date by paying the second party the termination fee.

17. An apparatus for implementing an asset sale and loan program for quantifying and transferring non-economic risk between a first party and a second party, said apparatus comprising:
a processor;
a display;
a memory coupled to the processor and containing instructions executable by the processor which, when implemented by the processor, cause the processor to execute the steps of:
receiving data representing an asset belonging to the first party, wherein the data includes a book value of the asset and principal payments of the asset;

generating an expected value of the asset based on the data representing the asset;

determining a deal value based on the book value and the expected value, wherein the second party purchases the asset from the first party for the deal value;

determining a loan amount based on the deal value such that the loan amount is less than the deal value, wherein the first party makes a loan to the second party for the loan amount, and wherein the second party makes periodic payments towards the loan from the principal payments of the asset;

calculating an equity amount based on the deal value and the loan amount, wherein the second party contributes the equity amount towards the purchase of the asset, receiving a term date for the loan;

determining aggregate principal payments (APP) of the asset as of the term date;

displaying whether the APP exceeds the loan amount on the display;

calculating any portion of the APP exceeding the deal value ("excess payments") due under the program; and indicating any portion of the excess payments due under the program, wherein the second party provides to the first party a portion of any excess payments.

18. The apparatus of claim 17 wherein calculating an economic value of the asset comprises:

performing a risk analysis based on the data representing the asset; and determining the net present value of expected future principal payments according to the risk analysis.

19. The apparatus of claim 17 wherein the data representing the asset further includes a maturity date of the asset, and wherein the term date for the loan is the maturity date of the asset.

20. The apparatus of claim 17 wherein the memory further contains instructions for:

determining a loan interest rate; and calculating a loan interest value, wherein the periodic payments towards the loan include the loan interest value.

21. The apparatus of claim 17 wherein the second party raises the equity amount by issuing equity shares having a face value to third-party investors.

22. The apparatus of claim 21 wherein the memory further contains instructions for calculating a equity share payment value having a base dividend based on a major interest rate index, wherein the second party periodically pays the equity share payment to the third-party investors.

23. The apparatus of claim 22 wherein the equity share payment also has a risk premium dividend that is based on a portion of the face value of the equity shares.

24. The apparatus of claim 17 wherein the memory further contains instructions for determining a termination fee for the early termination of the loan, wherein the first party is permitted under the program to cancel the program prior to the term date by paying the second party the termination fee.

* * * * *